(12) United States Patent
Wiseman et al.

(10) Patent No.: US 7,334,282 B1
(45) Date of Patent: Feb. 26, 2008

(54) CARGO TRANSFER ASSEMBLY ASSOCIATED WITH A PASSENGER BOARDING BRIDGE

(76) Inventors: Albert Wiseman, 2270 N. Highland Ave., Tarpon Springs, FL (US) 34688; Lee Webb, 414 Hawthorne Dr., Wilmington, OH (US) 45177

( * ) Notice: Subject to any disclaimer, the term of this patent is extended or adjusted under 35 U.S.C. 154(b) by 132 days.

(21) Appl. No.: 11/065,399

(22) Filed: Feb. 24, 2005

(51) Int. Cl.
*E01D 1/00* (2006.01)
(52) U.S. Cl. ...................................................... 14/71.3
(58) Field of Classification Search ................. 14/71.3, 14/71.5; 414/921
See application file for complete search history.

(56) References Cited

U.S. PATENT DOCUMENTS

| | | | | |
|---|---|---|---|---|
| 3,263,254 A | * | 8/1966 | Wollard et al. | 14/71.5 |
| 3,404,417 A | * | 10/1968 | Wollard et al. | 14/71.5 |
| 3,827,590 A | * | 8/1974 | Lodjic | 14/71.5 |
| 3,843,987 A | * | 10/1974 | Lodjic | 14/71.5 |
| 6,109,854 A | * | 8/2000 | Thompson et al. | 414/398 |
| 6,658,685 B1 | * | 12/2003 | Ratliff et al. | 14/71.5 |
| 6,676,359 B2 | * | 1/2004 | Ganiere | 414/391 |
| 6,854,147 B1 | * | 2/2005 | Ahlsten | 14/69.5 |
| 7,128,186 B2 | * | 10/2006 | Ganiere | 182/63.1 |
| 7,168,119 B1 | * | 1/2007 | Telford et al. | 14/71.5 |

* cited by examiner

*Primary Examiner*—Gary S. Hartmann
(74) *Attorney, Agent, or Firm*—Malloy & Malloy, P.A.

(57) ABSTRACT

A cargo transfer assembly structured to move baggage, handicapped vehicles such as wheelchairs, and other cargo between a passenger boarding bridge and the tarmac, ground or other supporting surface on which the boarding bridge is positioned. A lifting assembly having a lift apron and a lift tray connected thereto is movable between a raised position and a lowered position. A mobile cart structured to carry the cargo thereon is removably mounted on the lift tray and movable therewith in accessible relation to the boarding bridge and the supporting surface when in the raised position and lowered position respectively. A leveling assembly is disposed and structured to align the lift tray with the support surface when in the lowered position and with a corresponding portion of the base of the boarding bridge, when the lift tray is in the raised position.

17 Claims, 8 Drawing Sheets

CARGO TRANSFER ASSEMBLY ASSOCIATED WITH A PASSENGER BOARDING BRIDGE

BACKGROUND OF THE INVENTION

1. Field of the Invention

This invention relates to a cargo transfer assembly for delivering various types of cargo, including luggage, wheelchairs invalid scooters, etc., between a passenger boarding bridge for an aircraft and the ground or other supporting surface on which the passenger boarding bridge and/or aircraft is positioned. A lifting assembly includes a lift tray for containment of the cargo during transfer and a leveling assembly facilitates aligned positioning of the lift tray along an inclined or other correspondingly disposed portion of the boarding bridge when in a raised position, as well as a substantially level alignment with the supporting surface when in a lowered position.

2. Description of the Related Art

The popularity and resulting importance in air travel has long been established. As such, an increasing number of passengers travel by commercial airline in virtually all industrial and modernized counties throughout the world. With the ever increasing number of passengers, logistics such as, but not limited to, luggage and like passenger related cargo handling is a significant concern, affecting cost of operations as well as the passengers' perception of an airline's reliability and efficiency. Cargo handling facilities and procedures have been subjected to additional and more severe scrutiny due to the relatively recent threats of terrorism which in certain instances have been directly related to airline travel.

In order to assure profitability of airline operations, a predetermined number of passengers must be effectively accommodated within the passenger compartment of the airplane. At the same time, the airlines have attempted to design the baggage handling procedures to incorporate a certain degree of convenience by allowing passengers to have a restricted amount or number of "carry on" luggage. Such luggage, when appropriately sized may be stored within designated areas on the interior of the passenger cabin rather than being checked and stored in the cargo carrying facilities of an aircraft. However, a frequent occurrence during the loading of passengers is the collection of carry on luggage as well as other cargo such as wheelchairs, children's strollers and other personal or invalid vehicles at the entrance to the aircraft and at the aircraft access end of the passenger boarding bridge. Such personal luggage, wheelchairs, vehicles, etc., are oftentimes not capable of being efficiently and safely stored within the passenger compartment. As a result, such cargo must be transferred from the passenger boarding bridge to the tarmac, ground surface or other supporting surface on which a boarding bridge as well as the aircraft being boarded is located. The prior to departure, the collected luggage or other cargo is transferred to the cargo storage facilities normally found in the underbelly of the aircraft.

The transfer of cargo between an airport boarding bridge and the ramp level or ground surface is recognized as an ever increasing problem due, at least in part, to a lack of efficient cargo transferring facilities and procedures associated therewith. Such problems have been compounded by the fact that the cargo, having been stored in the cargo area of an aircraft, must then be returned to the boarding bridge where it is claimed or required for use once the aircraft has landed.

Past attempts to overcome this problem have at least initially involved the use of personnel wherein the cargo to be transferred was hand carried up and down access facilities normally mounted on the exterior of the boarding bridge. It was soon realized that such manual transfer procedures were too labor intensive, time consuming and generally inefficient. Succeeding attempts of cargo transfer of the type referred to include the installation and use of a baggage slide or chute structures, wherein cargo would be transferred by gravity along the slide or chute from the raised boarding bridge to the ground or supporting level. However, procedures and techniques associated with these known or conventional attempts resulted in frequent damage to the luggage or cargo being transferred and still did not totally eliminate the requirement of personnel to hand carry the luggage from the end of the baggage slide or chute to the cargo hold of the aircraft. Obvious disadvantages associated with these known attempts at cargo handling included the inability to return at least a portion of the luggage or cargo to the boarding bridge when such was found necessary, such as in the case of invalid or child carrying vehicles, etc.

Continued problems and inefficiencies associated with cargo transfer between the boarding bridge and the cargo hold of the aircraft led to more sophisticated transfer facilities and procedures primarily in the form of elevator type lift devices. As a result, cargo elevator assemblies were specifically structured to lift luggage and cargo, of the type set forth above, between the boarding bridge and ground or other supporting surface in the general vicinity of the aircraft. Known or conventional lift and/or elevator assemblies of this type, while representing at least a minimal improvement over the aforementioned manual and gravity transfer facilities, still include significant disadvantages and problems which render such facilities less than totally efficient or satisfactory.

By way of example, the cargo handling platforms of such known systems are sometimes considered to be inadequate for the transfer of different types of cargo such as, but not limited to, invalid scooters, personal wheelchairs or the like. Also, the elevator or lift framework associated with such known devices can typically be attached or connected to the boarding bridge only in limited areas where the surface or ramp area of the boarding bridge is not angularly oriented. The resulting disadvantage relates to the fact that the existence of inclined portions is prevalent in the vast majority of boarding bridges used in airports throughout the world. Also, the structural assemblies used to secure the elevator or lift assemblies to the boarding bridge are frequently cumbersome, complex, bulky and are frequently located at least partially beneath under portions of the boarding bridge. A danger of injuring personnel as well as possibly damaging an aircraft being serviced thereby exists.

Therefore, there is a significant and well recognized need in the airline industry for a cargo transfer assembly which efficiently and effectively serves to transfer a variety of different types of luggage, cargo, etc. between the passenger boarding bridge of an aircraft and the ground or supporting surface on which both the boarding bridge and the aircraft are disposed. Further, if developed, such a preferred cargo transfer assembly should be structured to be mounted on, connected to or otherwise associated directly with the boarding bridge in a manner which does not jeopardize the safety of personnel passing beneath or otherwise adjacent to the exterior of the boarding bridge.

Also, a preferred cargo transfer assembly should be capable of automatically assuming substantially level or aligned orientation with either the ground surface when in a lowered position or any angled or level surface of the passenger boarding bridge when in a raised position. A preferred or improved transfer assembly, once developed, should also incorporate a mobile cart having a cargo support surface thereon which is adaptable to hold a variety of different types of luggage or cargo and be otherwise structured to contain such cargo as the mobile cart is removed from the transfer assembly for mechanized carrying to the cargo hold of an aircraft. As such, an improved and preferred transfer assembly would overcome many, if not all, of the deficiencies, problems and inadequacies associated with known and conventional procedures and facilities conventionally used to transfer cargo in the airline industry.

SUMMARY OF THE INVENTION

The present invention is directed to a transfer assembly structured to move cargo between a passenger boarding bridge, such as the type for loading passengers onto an aircraft, and a supporting surface for the boarding bridge and an adjacently positioned aircraft. The structure and function of the various preferred embodiments of the transfer assembly of the present invention overcome many of the disadvantages and inefficiencies associated with the known facilities of this type by also addressing the problem of delivering the cargo to and removing it from the cargo hold of the aircraft.

As will be explained in greater detail hereinafter, the various operative components of the transfer assembly of the present invention may be secured to and supported by the passenger boarding bridge at any appropriate and convenient location along the length thereof such as, but not limited to, an inclined portion of the boarding bridge or a substantial level portion thereof. Accordingly, the transfer assembly demonstrates a significant degree of versatility in its installation, operation and maintenance and involves a minimal participation of airline or airport personnel while providing maximum convenience to passengers by virtue of its speed and efficiency in accomplishing the cargo transferring procedure.

More specifically, at least one preferred embodiment of the transfer assembly of the present invention comprises a support assembly mounted on the boarding bridge and including at least one end or other portion thereof extending outwardly from a side thereof. As such, the transfer assembly is mounted in communicating relation with an access area of the boarding bridge. A lifting assembly includes an elongated lift apron connected to the outboard end or portion of the support assembly and includes a lift tray connected thereto. Cooperative structuring between the lift apron and the lift tray facilitates selective positioning of the lift tray relative to the boarding bridge and its supporting surface between a raised position and a lowered position.

Therefore, it should be readily apparent that when in the raised position, the lift tray is disposed in accessible communication with the boarding bridge so as to receive cargo intended to be transferred to the cargo hold of the aircraft or alternatively, to deliver cargo previously stored in the cargo hold to the boarding bridge. When in the lowered position, the lift apron is disposed in a downwardly extended orientation, such that the lift tray thereon is in direct accessible communication with the supporting surface of the boarding bridge and associated aircraft. Accordingly, when in the lowered position the cargo being transferred can be removed from the lift tray and placed in the cargo hold prior to the aircraft's departure. Similarly, the lowered position of the lift apron and lift tray facilitates transfer of the cargo from the cargo hold onto the lift tray for subsequent delivery of the cargo back to the boarding bridge.

In order to further facilitate cargo transfer, one preferred embodiment comprises a mobile cart removably supported on the lift tray and movable therewith in both an accessible communicating relation to the boarding bridge and the supporting surface. More specifically, the mobile cart is specifically dimensioned, configured and structured to be securely positioned on and supported by the lift tray as the lift tray moves between the raised and lowered positions. As such, the mobile cart includes a cargo retaining and/or supporting platform on which the cargo being transferred is positioned during the raising and lowering procedure.

In addition, the mobility of the cart allows it to be easily and quickly removed from its supported position on the lift tray, such as when the lift tray is in the lowered position on the supporting surface and in an accessible location relative to the aircraft. By way of example, the mobile cart may be removed from the lift tray when in the lowered position. Transport of the cargo being transferred is then accomplished by moving the mobile cart into a position to deliver the cargo into the cargo hold of the aircraft from the supporting surface of the aircraft. Similarly, upon arrival of the aircraft, cargo to be transferred back to a boarding bridge is placed on the platform of the mobile cart and the mobile cart then travels over the ground or supporting surface and is positioned in its normally supported position on the lift tray. The lift apron and the lift tray are then disposed into the raised position such that the lift tray, as well as the mobile cart and the transferred cargo on the platform thereof, are in direct accessible communication with the boarding bridge or a portion thereof specifically designated to receive cargo.

Yet additional structural and operative features of at least one preferred embodiment of the transfer assembly enhances the versatility of the transfer assembly by enabling it to be installed or mounted along virtually any appropriate portion of the boarding bridge. As is well recognized in the use and operation of passenger boarding bridges, it is commonplace for at least a portion of the boarding bridge to be oriented at an incline as it extends from the terminal, outwardly to the entrance door of the aircraft. Moreover, common structuring and operative placement of the boarding bridge upon its communicative engagement with the aircraft involves a loading/unloading or access area immediately adjacent to the aircraft when the boarding bridge engages the exterior of the aircraft. This portion of the boarding bridge is normally maintained in a level orientation so as to assure safety and stability of the passengers as they pass into or out of the aircraft. However, this level access area is relatively small as compared to the remainder or inclined ramp portion of the boarding bridge.

Known or conventional lift or elevator devices would typically be mounted or connected to the passenger bridge so as to be disposed in communication with this level access area. However, the transfer assembly of the present invention overcomes disadvantages and problems associated with the limited area of installation of conventional cargo lift or elevator structures. To the contrary, at least one preferred embodiment of the present invention incorporates a leveling assembly interconnecting the lift assembly and more specifically the lift apron to a remainder of the support assembly. Further, the leveling assembly is disposed and structured to automatically align the lift tray in a substantially level relation to the support surface when in a lowered position and is further structured to substantially align the lift tray with a correspondingly positioned level or angularly oriented portion of the boarding bridge when in a raised position. Therefore, the support assembly can be mounted at any practical location along the length of the boarding bridge, including an inclined portion thereof, because the leveling assembly is structured to automatically accomplish an alignment with any correspondingly positioned portion of the boarding bridge whether it is inclined or level. Any disadvantages associated with placement and/or installation of the support assembly on the boarding bridge is thereby overcome.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As shown in the accompanying drawings, the present invention is directed to a transfer assembly, generally indicated as 10 of the type specifically structured and operative to transfer a variety of cargo to and from a passenger boarding bridge generally indicated as 12. As represented, the passenger boarding bridge 12 is of the type utilized at airports and disposed in interconnecting relation between various gates of the terminal building or other departure areas and the aircraft, prior to its departure or upon its arrival. Moreover, the passenger boarding bridge 12 includes a hollow interior 14 having a ramp or walkway area as at 16.

Figure 2:
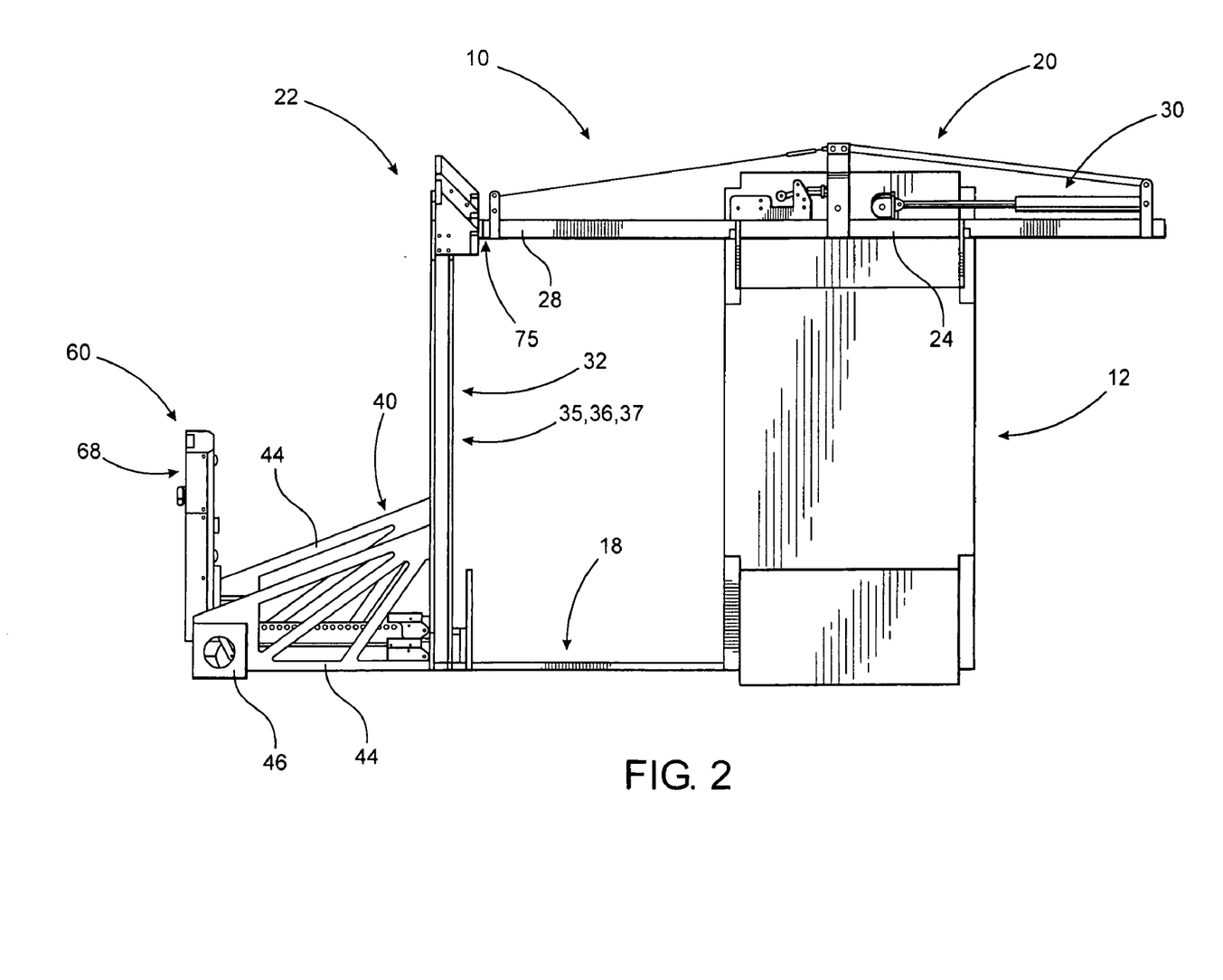
FIG. 2 is a side view of the embodiment of FIG. 1.
Figure 5:
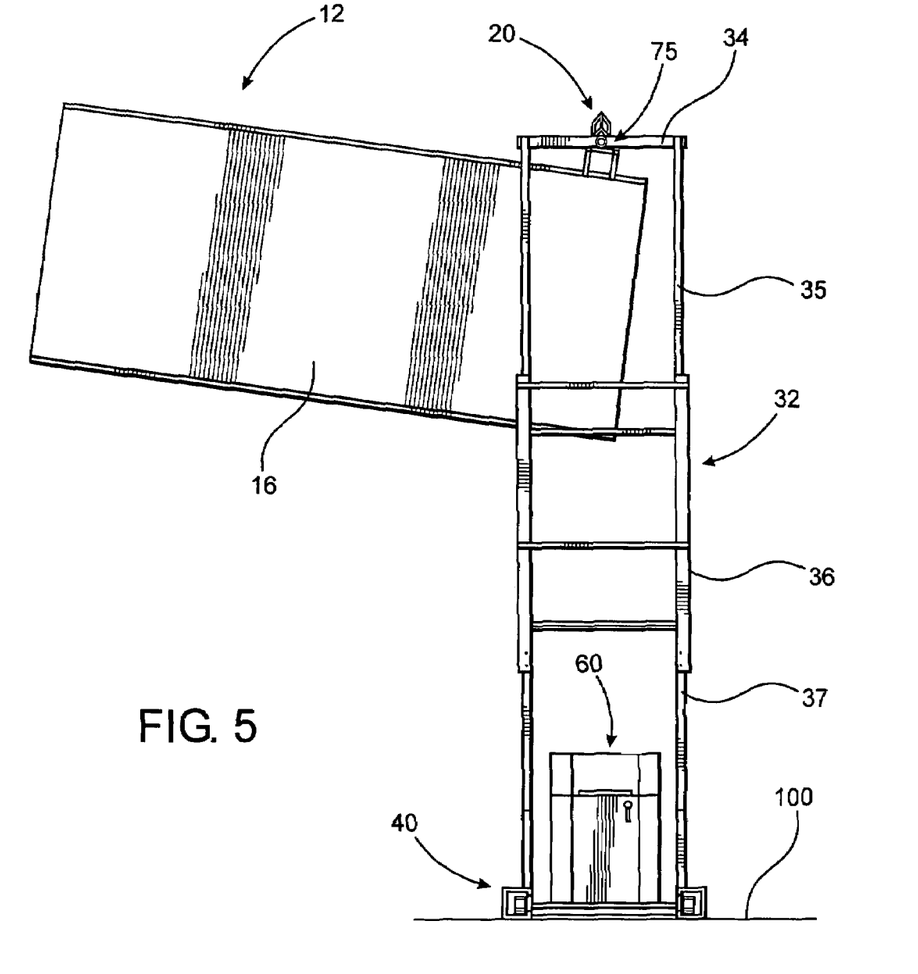
FIG. 5 is a front view of the embodiment of FIGS. 1 through 4 with the transfer assembly in a lowered position and the lift tray and mobile cart disposed in a level orientation relative to the ground or other supporting surface.
Figure 6:
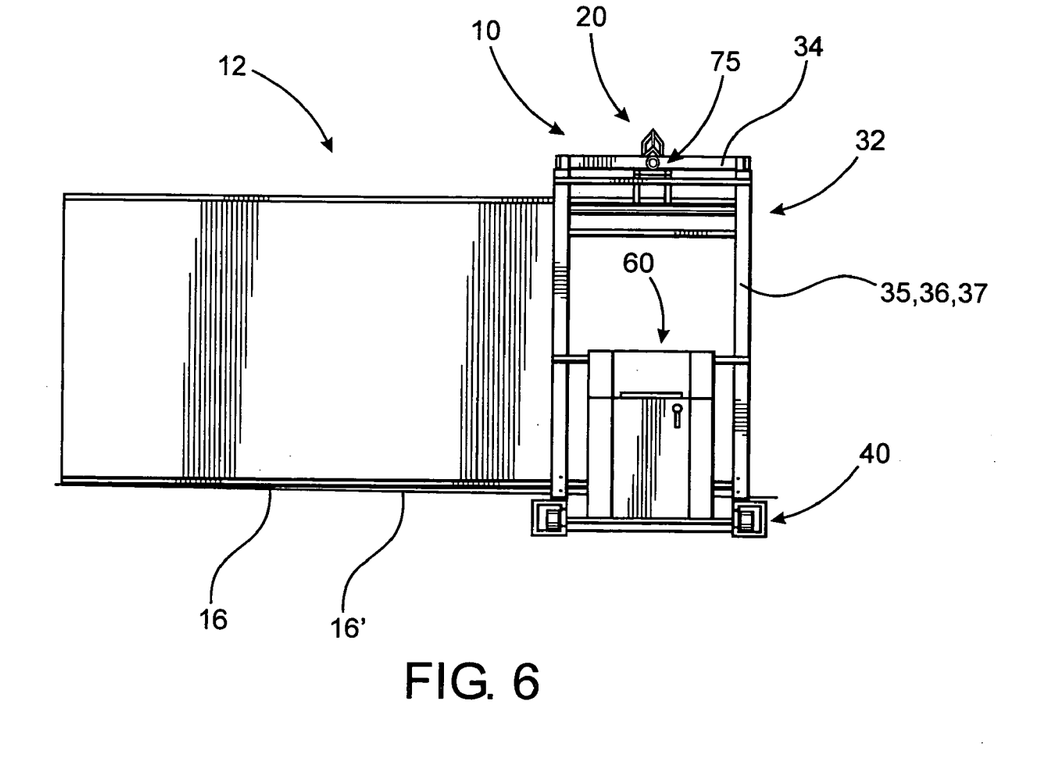
FIG. 6 is a front view of the embodiment of FIG. 5 in a raised position, wherein the lift tray and mobile cart are disposed in a substantially level orientation with an angled portion of the passenger bridge.

As at least partially demonstrated in FIGS. 5 and 6 an extended portion of at least the ramp 16 is normally oriented at an at least partial incline as it extends from the terminal or departure area to the aircraft. Moreover, the passenger boarding bridge 12 normally includes or is otherwise associated with a level access area generally indicated as 18. As represented in FIG. 2, the access area 18 may be located both on the interior and exterior of the boarding bridge 12 and is further disposed at the end of the boarding bridge 12 immediately adjacent the aircraft. As such, the access area 18 is normally level so as to assure the safety of the passengers as they move into and out of the aircraft. As will be explained in greater detail hereinafter, the cargo transfer assembly 10 demonstrates increased versatility and overcomes recognized disadvantages in known and/or conventional elevator and lift assemblies of this type by being installed on or connected to the boarding bridge 12 at any appropriate portion thereof, whether it be along the inclined ramp area 16 or the substantially level access area 18.

Figure 1:
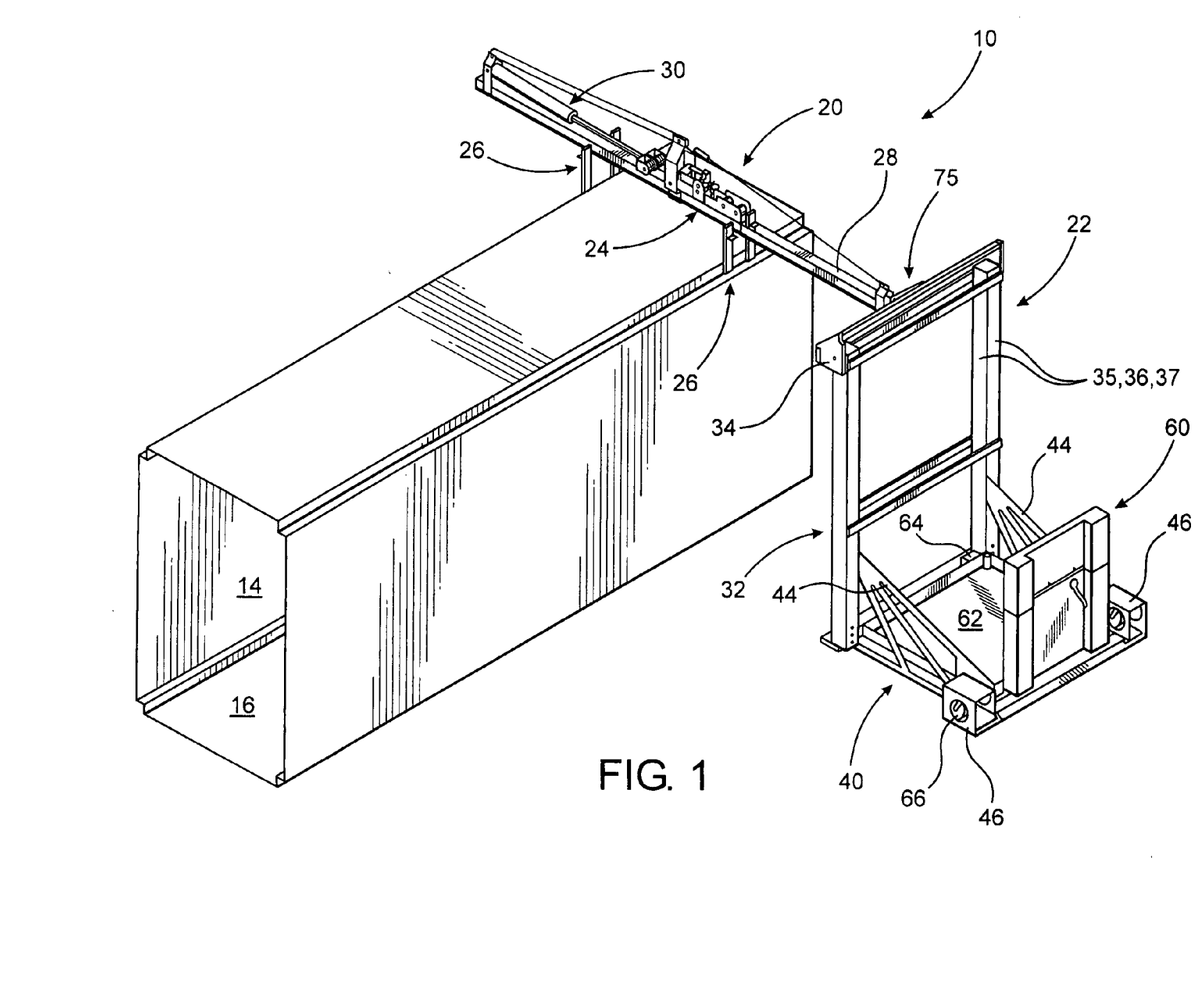
FIG. 1 is a perspective view in partial cutaway of one preferred embodiment of the transfer assembly of the present invention demonstrated in a raised position.
Figure 3:
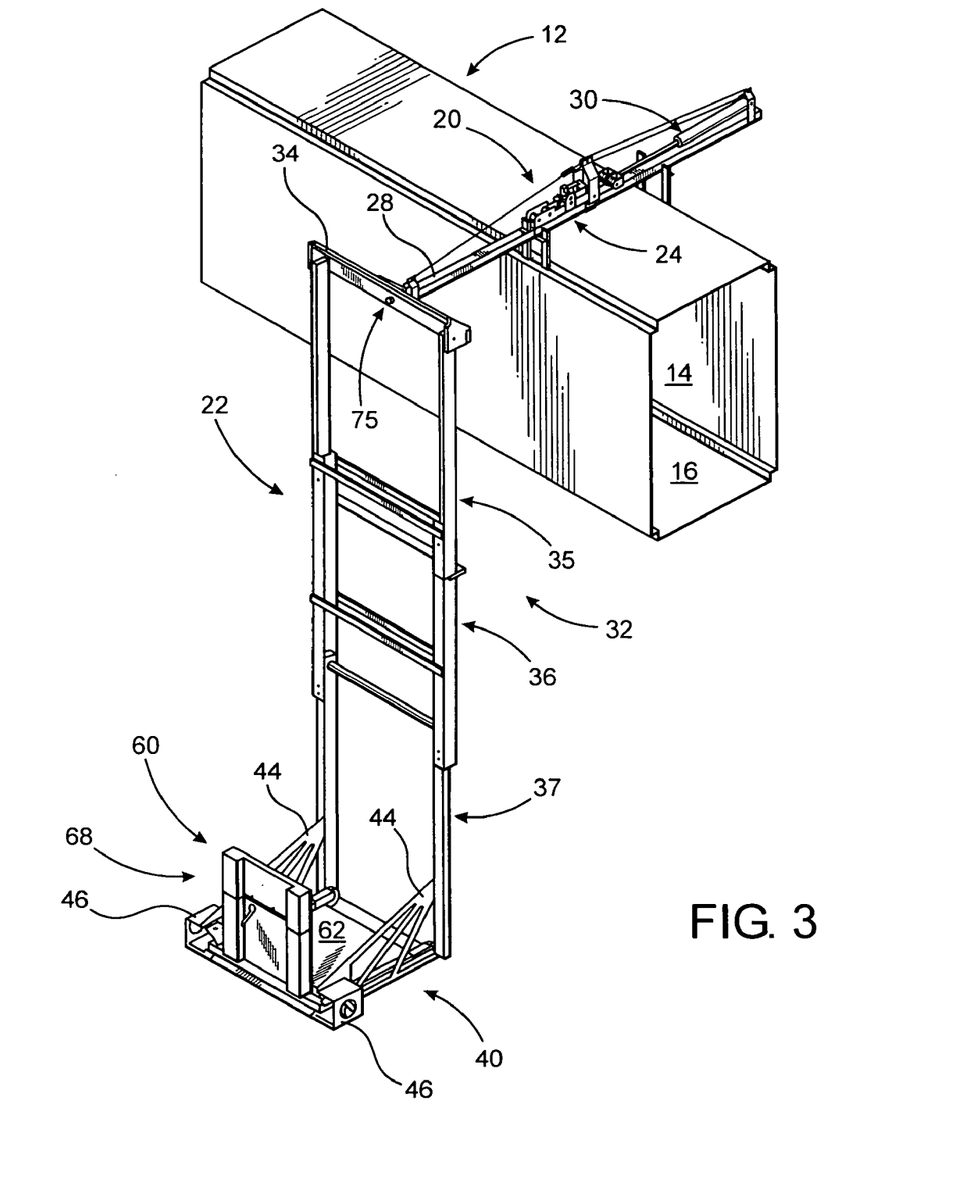
FIG. 3 is a perspective view in partial cutaway of the embodiment of FIGS. 1 and 2 in a lowered position.
Figure 4:
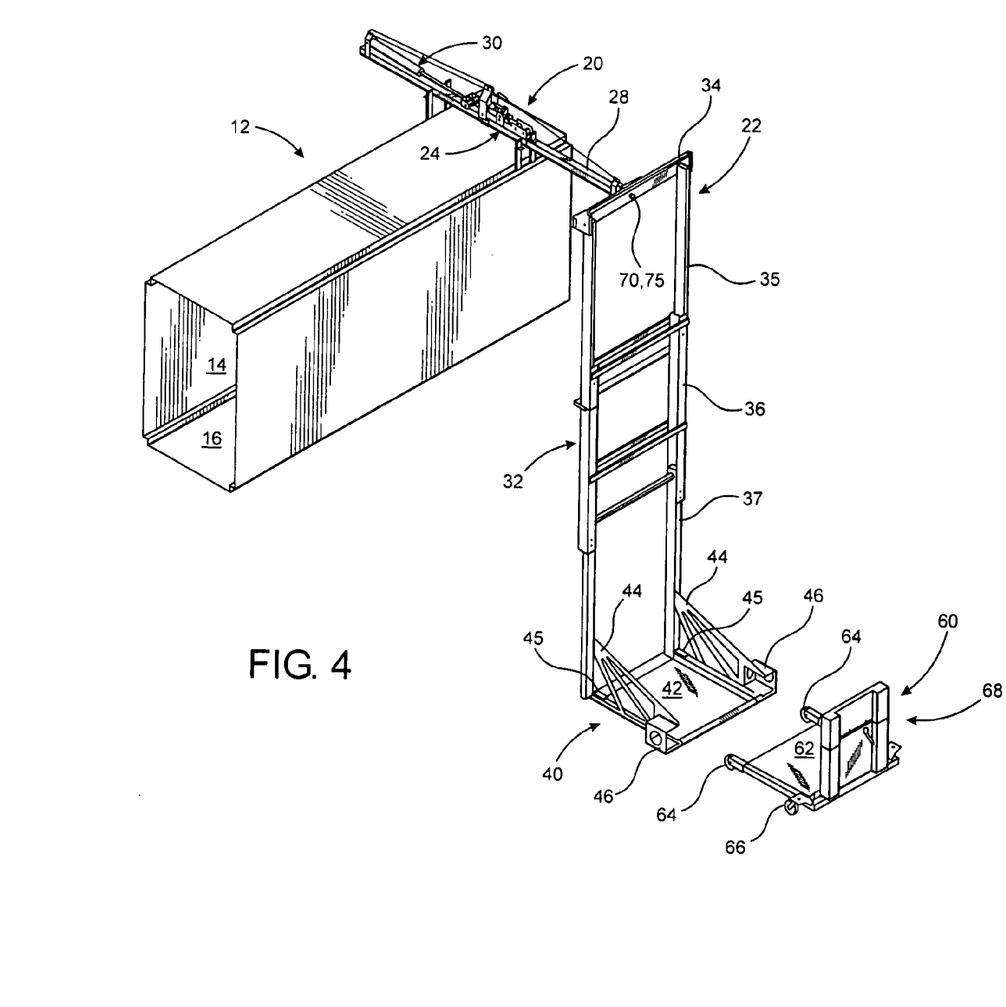
FIG. 4 is a perspective view in partial cutaway of the embodiment of FIGS. 1 through 3 in a lowered position, wherein a mobile cart is removed from a lift tray portion of the transfer assembly.

More specifically, the cargo transfer assembly 10 of the present invention includes a support assembly generally indicated as 20. The support assembly 20 supports and interconnects a lift assembly generally indicated as 22 to the boarding bridge 12 in the manner and location demonstrated primarily in FIGS. 1 through 4. As such, the support assembly 20 preferably includes an elongated support beam 24 connected to and extending in overlying relation to an upper portion of the boarding bridge 12 by virtue of a plurality of appropriately disposed and structured mounts 26. Moreover, the support beam 24 is secured at a stable location relative to any inclined or substantially level portion of the boarding bridge 12 as set forth above. Moreover, one end or other portion, generally indicated as 28, extends outwardly from one side of the boarding bridge 12 where it is connected to and supports the lift assembly 22 in a substantially cantilevered fashion. Other structural and operative features of the support assembly 20 include a drive assembly such as, but not limited to, a hydraulic or other fluid piston and cylinder mechanism 30 which is disposed and structured to facilitate the selective disposition of the lift assembly 22 in either a raised position as demonstrated in FIGS. 1 and 2 or a lowered position as represented in FIGS. 3 and 4.

The lift assembly 22 includes a lift apron 32 having its upper end comprising a cross brace or like member 34 movably connected to the outboard end or portion 28 of the support beam 24. As clearly demonstrated in FIGS. 3 and 4, the lift assembly 22 comprises a plurality of interconnected and relatively movable sections 35, 36 and 37 which may vary in number and structure. The sections 35, 36 and 37 are movable relative to one another so as to facilitate selective disposition of the lift apron 32 in either the raised or lowered positions of FIGS. 1 through 6. The lift assembly 22 further includes a lift tray generally indicated as 40. The lift tray 40 is connected to the lift apron 32 such as by its fixed connection or attachment to at least one of the lift apron sections, as at 37. The present invention further contemplates that the fixed and stable connection of the lift apron 40 to an appropriate and/or corresponding portion of the lift apron 32 may be integrally and/or permanently attached. Additional structural features of the lift tray 40 include a base 42 and oppositely disposed spaced apart retaining structures 44 disposed on opposite sides of the base 42. As will be evident from further description provided hereinafter, the retaining structures 44 are disposed, dimensioned and configured to help retain and therefore stabilize any cargo being transferred to or from the passenger boarding bridge 12, especially during the selective positioning of the lift tray 40 between and into both the raised and lowered positions, as set forth above.

The lift tray 40 is structurally adapted to retain and support a mobile cart 60 thereon, wherein the mobile cart 60 is structured to retain and support the luggage or a variety of other types of cargo on a cargo platform 62. As such, the lift tray 40 includes additional structural features for stabilizing the positioning of the mobile cart 60 once it is disposed in its supported position on the base 42. Such additional structural features of the lift tray 40 include receiving areas or structures 45 and 46 for receiving and removably retaining the wheels or like movable support assemblies 64 and 66 of the mobile cart 60. Additional structural and operative features of the mobile cart 60 will be described in detail with primary reference to FIGS. 7 and 8. However, one feature of the mobile cart 60 is its ability to travel between the raised and lowered positions of the lift apron 32 so as to receive and deliver luggage and other cargo to and from an appropriate portion of the boarding bridge 12. In addition, the mobility of the cart 60 allows it to be easily and quickly removed from the lift tray 40 and travel over the ground or other supporting surface 100 so as to transfer the luggage and cargo to and from the aircraft.

Figure 7:
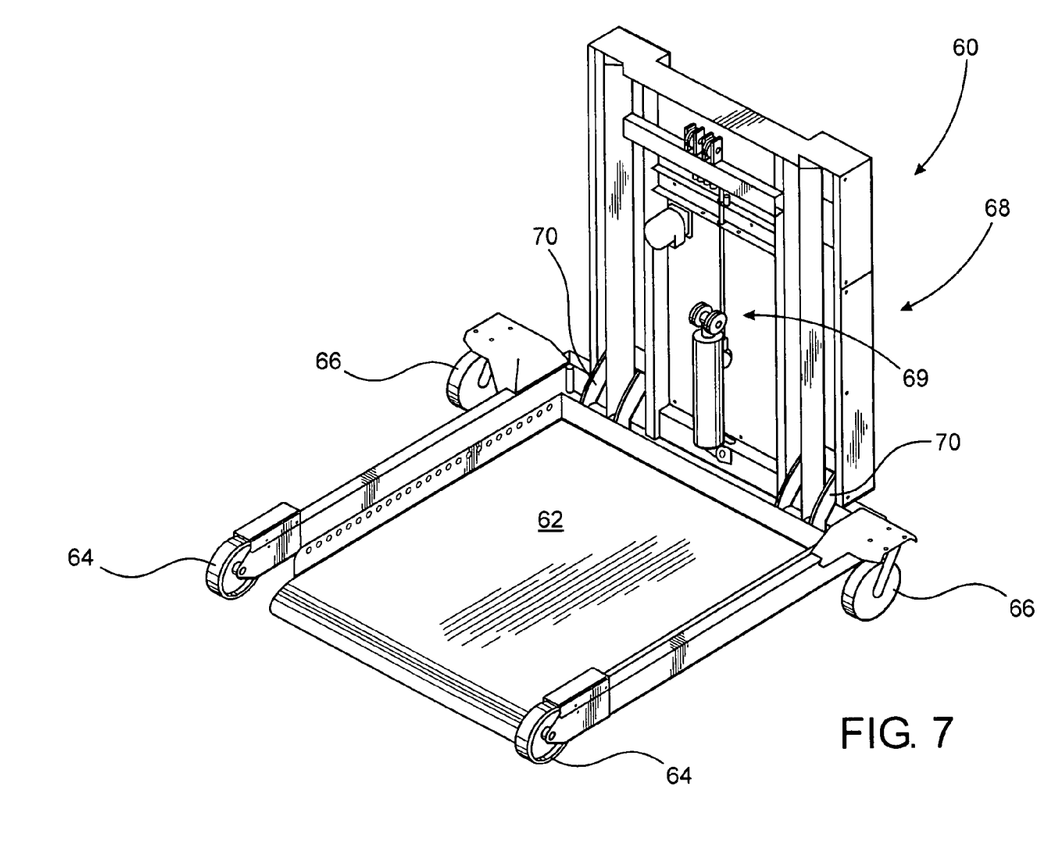
FIG. 7 is a perspective view of one preferred embodiment of the mobile cart wherein, the cargo support platform thereof is disposed in a lowered, retracted position.
Figure 8:
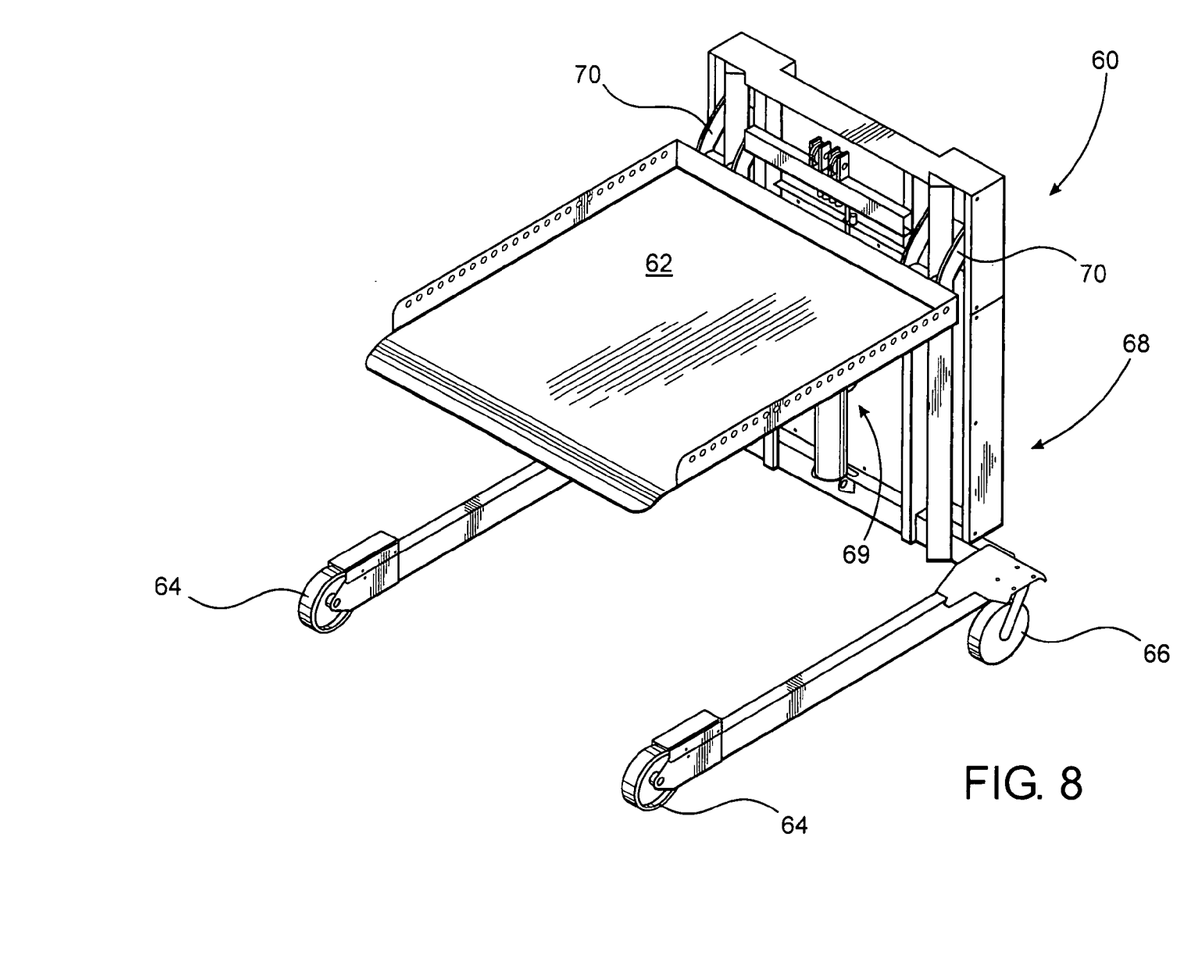
FIG. 8 is a perspective view of the embodiment of FIG. 7 wherein the cargo support platform is in a raised, extended position.

In order to further facilitate transfer of cargo to and from the lift assembly 22 when the lift apron 32 and lift tray 40 are in the lowered position, the mobile cart 60 is specifically structured to selectively dispose the cargo support platform 62 in either the lowered, retracted position represented in FIG. 7 or the raised, extended position demonstrated in FIG. 8. More specifically, as the cargo is being transferred either to or from the cargo hold or like area of the aircraft, the handling of the cargo is facilitated by the orientation of the support platform 62 in the raised position of FIG. 8. This will serve to locate the support platform 62 in a better communicating and/or accessible position relative to the cargo hold of the aircraft in which the luggage or cargo is being stored and transported. It should be apparent therefore that the support platform 62 is selectively disposed in the extended position of FIG. 8 for transferring of the luggage and cargo into the cargo hold or when such luggage and cargo is intended to be removed therefrom and returned to the boarding bridge 12.

In contrast, the support platform 62 is maintained in the lowered, retracted position of FIG. 7 such as when the mobile cart 60 is disposed on the lift tray 40 as it moves between or is located in the raised or lowered positions. Naturally, in order to safely retain and stabilize the cargo being transferred, the platform 62 would under most circumstances be in its lowered, retracted position as demonstrated in FIGS. 1 through 4. Further, in the raised position of the lift tray 40, the retracted position of the support platform 62 would serve to best provide access to the cargo as it is being positioned thereon or removed therefrom relative to the passenger boarding bridge 12 and/or the interior or exterior access area 18 associated therewith.

With further reference to FIGS. 7 and 8, additional structural and operative features of the mobile cart include an upstanding, frame portion generally indicated as 68 and a power and/or drive assembly 69 which is mounted thereon so as to selectively position a lift assembly 70 interconnected to the support tray 62 as disclosed. The power or drive assembly 69 may be hydraulically, electrically and/or mechanically operable and as such may assume a variety of different structural and operative characteristics which best accomplish the selective orientation of the support platform 62 between the lower, retracted position of FIG. 7 and the upwardly extended position of FIG. 8.

Another distinguishing feature of at least one preferred embodiment of the cargo transfer assembly 10 of the present invention which enhances the versatility thereof while overcoming disadvantages and problems associated with known or conventional cargo lift and/or elevator apparatus is the provision of a leveling assembly generally indicated as 75. The leveling assembly 75 is disclosed in the accompanying Figures and explained in greater detail with primary reference to FIGS. 5 and 6. More specifically, the leveling assembly 75 comprises a coupling or connecting structure which movably and more specifically pivotally or rotationally interconnects the lift apron 32 to the outwardly extending end or portion 28 of the support beam 24. It is emphasized that the coupling and/or connecting structure of the leveling assembly 75 may be defined by a variety of different structures, wherein a primary function and purpose thereof is to facilitate an automatic alignment of the lift tray 40 and accordingly the mobile cart 60 supported thereon with a correspondingly positioned portion of the boarding bridge 12 or the ground surface 100 dependent on whether the lift apron 32 and the lift tray 40 or in the raised position or the lowered position.

Accordingly, the pivotal or at least partially rotational connection between the upper end brace 34 of the lift apron 32 and the outboard end or portion of the support beam 24 facilitates a substantially vertical orientation of the lift apron 32 as it travels from the boarding bridge 12 into the completely lowered position demonstrated in FIG. 5. When the under portion of the lift tray 40 engages the ground or other supporting surface 100 automatic leveling or alignment between the lift tray 40 and the supposedly level ground surface 100 will thereby be accomplished regardless of the incline or angular orientation of the portion of the boarding bridge 12 to which the support assembly 20 is secured. Such automatic leveling will be accomplished by allowing the lift tray to pivotally adjust to and thereby assume the same level as the ground surface.

Similarly, as the lift apron 32 travels into the raised position demonstrated in FIG. 6, the lift apron 32 will still be able to assume the substantially vertical orientation demonstrated in FIG. 5. However, when reaching the completely raised position represented in FIG. 6, the pivotal or at least rotational coupling structure defining the leveling assembly 75 will serve to automatically tilt or angularly align the lift tray 40, including the base portion 42 thereof, with the correspondingly positioned portion of the boarding bridge, which it engages. Therefore, when the lift tray 40 is selectively disposed into the raised position demonstrated in FIG. 6, the base 42, the mobile cart 60, as well as a remainder of the lift tray 40 will automatically be disposed in a substantial alignment with the inclined portion, generally as at 16' of the boarding bridge 12. Therefore, as set forth in detail above, the cargo transfer assembly 10 may be connected to or otherwise installed on any appropriate portion of the boarding bridge 12 whether it is inclined or angularly oriented as demonstrated in FIGS. 5 and 6 or whether it is connected to a substantially level, access area 18 as demonstrated in FIG. 2.

It should be apparent that the cargo transfer assembly 10 of the present invention quickly, efficiently and economically serves to transfer conventional luggage as well as a variety of other less conventional cargo between the boarding bridge and cargo hold of an aircraft utilizing minimal personnel while significantly reducing the possibility of damage to the luggage or cargo being transferred.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A transfer assembly for moving cargo between a passenger boarding bridge and a supporting surface therefore, said transfer assembly comprising:
   a) a support assembly mounted on the boarding bridge,
   b) a lifting assembly including a lift apron interconnected to the boarding bridge by said support assembly,
   c) a lift tray connected to said lift apron and movable therewith relative to the boarding bridge between raised and lowered positions,
   d) a leveling assembly structured to align said lift tray into a substantially level orientation with the supporting surface when in said lowered position and with a correspondingly positioned portion of the boarding bridge when in said raised position, and
   e) said support assembly including a support beam connected in overlying, transverse, cantilevered relation to an upper portion of the boarding bridge, said support beam extending outwardly from at least one side of the boarding bridge.

2. A transfer assembly as recited in claim 1 wherein said lift apron is connected in depending, supported relation to one end of said support beam.

3. A transfer assembly as recited in claim 1 wherein said lift apron is connected in depending suspended relation to one end of said support assembly.

4. A transfer assembly as recited in claim 1 further comprising a mobile cart structured to carry cargo thereon and positionable in supported relation on said lift tray and movable therewith between said raised and lowered positions.

5. A transfer assembly as recited in claim 4 wherein said cart is removable from said lift tray and transportable with the cargo being contained thereon along the support surface.

6. A transfer assembly as recited in claim 4 wherein said cart comprises a platform disposed and dimensioned to support cargo thereon, said platform movable on said cart between extended and retracted positions.

7. A transfer assembly as recited in claim 6 wherein said platform is selectively positionable along a height of said cart when being disposed between said extended and retracted positions.

8. A transfer assembly as recited in claim 1 wherein said leveling assembly comprises a coupling assembly pivotally interconnecting said lift apron to said support assembly and structured to substantially align said lift tray with either a correspondingly disposed level or angularly oriented portion of the boarding bridge when said lift tray is in said raised position.

9. A transfer assembly as recited in claim 8 wherein said coupling assembly is disposed and structured to pivotally interconnect said lift apron to said one end of said beam in suspended relation thereto.

10. A transfer assembly as recited in claim 1 wherein said raised position is at least partially defined by said lift tray and said lift apron being disposed at a predetermined spaced distance from the supporting surface, said predetermined spaced distance being substantially equal to or greater than a distance between an under portion of the boarding bridge and the supporting surface.

11. A transfer assembly for moving cargo between a passenger boarding bridge and a supporting surface therefore, said transfer assembly comprising:
   a) a support assembly mounted on the boarding bridge,
   b) a lifting assembly including a lift apron interconnected to the boarding bridge by said support assembly,
   c) a lift tray connected to said lift apron and movable between raised and lowered positions,
   d) a mobile cart removably mounted on said lift tray and movable therewith in accessible relation to the boarding bridge and the supporting surface when in said raised position and said lowered position respectively,
   e) a leveling assembly disposed and structured to align said lift tray in a substantially level orientation with the supporting surface when in said lowered position and with a correspondingly positioned level or angularly oriented portion of the boarding bridge when in said raised position, and
   f) said leveling assembly comprising a coupling assembly pivotally interconnecting said lift apron to said support assembly.

12. A transfer assembly as recited in claim 11 wherein said support assembly includes at least one end extending outwardly from a corresponding side of the boarding bridge, said lift apron and said lift tray collectively disposed in supported, suspended relation from said one end in substantially adjacent relation to the corresponding side of the boarding bridge.

13. A transfer assembly as recited in claim 12 wherein said coupling assembly is disposed substantially at said one end and structured to pivotally connect said lift apron to said one end.

14. A transfer assembly as recited in claim 11 wherein said support assembly is connected to the boarding bridge along an inclined portion of its length.

15. A transfer assembly as recited in claim 11 wherein said cart comprises a platform disposed and dimensioned to support the cargo thereon, said platform movable on said cart between extended and retracted positions and said platform being selectively positionable along a height of said cart when being disposed between said extended and retracted positions.

16. A transfer assembly for moving cargo between a passenger boarding bridge and a supporting surface therefore, said transfer assembly comprising:
   a) a support assembly mounted on the boarding bridge and including at least one end thereof extending outwardly from one side of the boarding bridge,
   b) a lifting assembly including a lift apron and lift tray movable between raised and lowered positions,
   c) said lift apron and said lift tray collectively supported in suspended relation from said one end of said support assembly in substantially adjacent relation to said one side of said boarding bridge,
   d) a mobile cart removably mounted on said lift tray and movable therewith in accessible relation to the boarding bridge and the supporting surface when in said raised position and said lowered position respectively,
   e) a leveling assembly disposed and structured to align said lift tray with the support surface when in said lowered position and with a correspondingly positioned portion of the boarding bridge when in said raised position, and
   f) said leveling assembly comprising a coupling assembly disposed substantially at said one end of said support assembly and structured to pivotally connect said lift apron to said one end of said support assembly.

17. A transfer assembly as recited in claim 16 wherein said support assembly is connectable to the boarding bridge along an inclined portion of its length.

* * * * *